United States Patent
Barry et al.

(10) Patent No.: US 8,140,199 B2
(45) Date of Patent: Mar. 20, 2012

(54) SYSTEM AND METHOD FOR PREDICTING AIRCRAFT GATE ARRIVAL TIMES

(75) Inventors: James Barry, Madison, CT (US); James Cole, East Setauket, NY (US); Matthew Marcella, West Hempstead, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 603 days.

(21) Appl. No.: 11/590,417

(22) Filed: Oct. 31, 2006

(65) Prior Publication Data

US 2007/0124059 A1 May 31, 2007

Related U.S. Application Data

(60) Provisional application No. 60/731,713, filed on Oct. 31, 2005.

(51) Int. Cl.
*G06G 7/70* (2006.01)
*G06F 7/70* (2006.01)
*G05D 1/08* (2006.01)
*G08B 21/00* (2006.01)
*G01C 19/00* (2006.01)

(52) U.S. Cl. ............... 701/16; 701/14; 701/4; 340/945; 73/178 T

(58) Field of Classification Search ............ 701/1, 3–18, 701/23–27, 38, 44, 200–226; 340/945, 948–983; 342/2, 33, 39–40, 60–158, 357.53; 244/202, 244/183, 81, 110 E, 114 R, 17.17; 73/178 T
See application file for complete search history.

(56) References Cited

U.S. PATENT DOCUMENTS

| | | | |
|---|---|---|---|
| 6,600,982 B1 * | 7/2003 | Cragun | 701/36 |
| 2003/0050746 A1 * | 3/2003 | Baiada et al. | 701/3 |
| 2004/0054550 A1 * | 3/2004 | Cole et al. | 705/1 |
| 2004/0243302 A1 * | 12/2004 | Barry et al. | 701/204 |
| 2006/0086406 A1 * | 4/2006 | Sato et al. | 141/94 |
| 2006/0212180 A1 * | 9/2006 | Saffre | 701/3 |

OTHER PUBLICATIONS

Doshi, A, "Aircraft Position Prediction Using Neural Networks", MIT Libraries, Jul. 18, 2005, Master's thesis, Dept. of Electrical Engineering and Computer Science.*

* cited by examiner

*Primary Examiner* — James Trammell
*Assistant Examiner* — Muhammad Shafi
(74) *Attorney, Agent, or Firm* — Fay Kaplun & Marcin, LLP

(57) ABSTRACT

A method for receiving passive data corresponding to an aircraft in a vicinity of an airport, receiving additional information corresponding to the aircraft and predicting a time of arrival at a gate based on the passive data and the additional information. In addition, a system having a data receiving arrangement receiving passive data corresponding to an aircraft in a vicinity of an airport and additional information corresponding to the aircraft and a gate prediction module predicting a time of arrival at a gate based on the passive data and the additional information.

8 Claims, 2 Drawing Sheets

SYSTEM AND METHOD FOR PREDICTING AIRCRAFT GATE ARRIVAL TIMES

PRIORITY CLAIM/INCORPORATION BY REFERENCE

This application claims the benefit of U.S. Provisional Patent Application 60/731,713 filed on Oct. 31, 2005 and entitled "Predicting Aircraft IN times" and is expressly incorporated herein, in its entirety, by reference.

BACKGROUND

Current estimated time of arrival ("ETA") information is only an approximation of when the aircraft will land on the runway. However, there may be multiple reasons for individuals to desire to know the estimated time of arrival to a gate (ETAG). This ETA is a more accurate depiction of the actual time of arrival of the passengers. For example, an aircraft may arrive on the runway at a particular time, but be unable to pull up to an airport gate until much later, due to certain airport conditions (i.e., small airport and not enough gates to accommodate all arriving flights, etc.). This may create problems for passengers in terms of missed connecting flights, pre-planned travel itineraries, travel arrangements from the airport, etc. The ETA of aircrafts to the airport gate will allow individuals to choose connecting flights accordingly and provide a more accurate time frame making travel arrangements from the airport.

The ETA to an airport gate may also be useful for airports and airlines. The ETA may allow airports to optimize gate and ramp management and improve efficiency. It may also allow airlines to provide accurate information to their passengers for greater consumer satisfaction. These are only a few examples of the usefulness of ETA to arrival gates and there are many other reasons why such information may need to be known to individuals, agencies, airlines, etc.

SUMMARY OF THE INVENTION

A system having a data receiving arrangement receiving passive data corresponding to an aircraft in a vicinity of an airport and additional information corresponding to the aircraft and a gate prediction module predicting a time of arrival at a gate based on the passive data and the additional information.

A method for receiving passive data corresponding to an aircraft in a vicinity of an airport, receiving additional information corresponding to the aircraft and predicting a time of arrival at a gate based on the passive data and the additional information.

A system comprising a memory storing a set of instructions and a processor executing the instructions. The set of instructions being operable to receive passive data corresponding to an aircraft in a vicinity of an airport, receive additional information corresponding to the aircraft and predict a time of arrival at a gate based on the passive data and the additional information.

DETAILED DESCRIPTION

Figure 1:
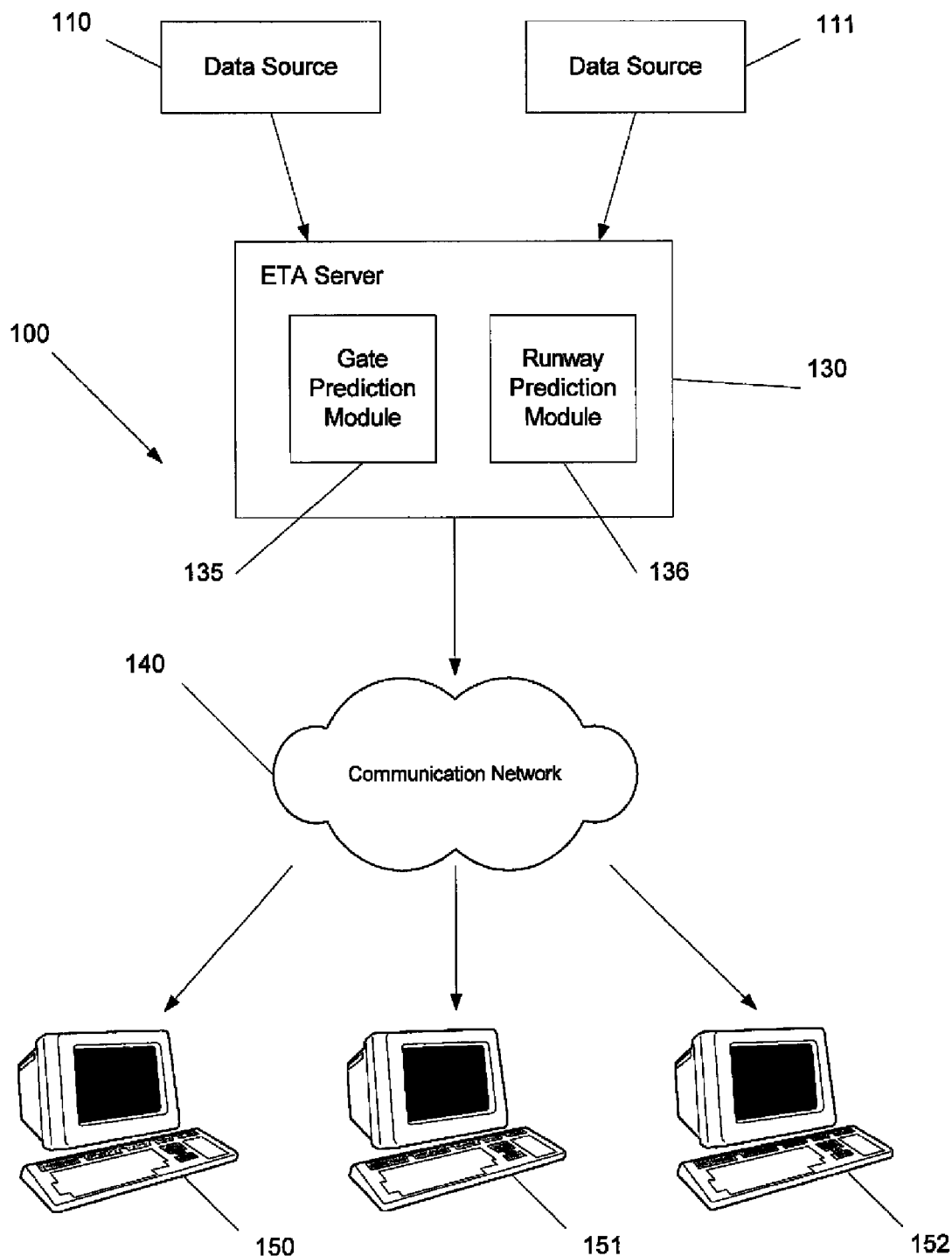
FIG. 1 shows an exemplary system for predicting ETAs to an arrival gate according to the present invention.

The present invention may be further understood with reference to the following description and to the appended drawings, wherein like elements are referred to with the same reference numerals. The exemplary embodiments of the present invention comprise a communications network which is designed to communicate the estimated time of arrival (ETA) of aircrafts to airport gates. The information may be viewed through the use of programs that access and display files and other data available on the communications network such as, for example, a web browser. The system may be accessible by a plurality of users such as, for example, airlines, terminal operators, passengers, etc. One exemplary embodiment of the present invention is described as a web based system. However, those skilled in the art will understand that there may be any number of other manners of implementing the present invention in embodiments that are not web based.

FIG. 1 shows an exemplary system 100 for predicting ETAs to an arrival gate according to the present invention. Data used to generate the ETA to an airport gate may be obtained from at least two data sources 110 and 111 that may be connected to an ETA server 130. The ETA server 130 may be connected to a communications network 140. The communications network 140 may allow users 150-152 to access the information generated by the ETA server 130. The user's stations 150-152 may be, for example, personal computers (PCs) or other computing platforms having network or modem access.

The ETA server 130 while shown as a separate component may be, a module or other component, that is included in other hardware and/or software. The actual physical implementation of the ETA server 130 is not critical to the exemplary embodiment of the present invention. Thus, any component that incorporates the functionality described herein for the ETA server 130 is sufficient. In addition, the ETA server 130 is shown as including the gate prediction module 135 for predicting the ETA of an aircraft at an airport gate. The ETA server 130 may also include a runway or landing prediction module (not shown) that is used to predict when an aircraft will land.

In the exemplary embodiment, two data sources 110 and 111 are shown. However, those skilled in the art will understand from this description that any number of data sources may be used to collect data that may be used to predict a gate ETA. One of the data sources 110 may be a data feed from a passive radar system. An exemplary passive radar system may be, for example, the PASSUR® System sold by Megadata Corporation of Greenwich, Conn. Target data points provided by a passive radar system for a particular aircraft may include, for example, the time (e.g., UNIX time), the x-position, the y-position, altitude, x-velocity component, y-velocity component, z-velocity component, the speed, the flight number, the airline, the aircraft type, the tail number, etc.

To predict the runway ETA, data that is collected by the passive radar system on the present aircraft being monitored and previously monitored aircraft may be sufficient. For example, the passive data source 110 may provide the aircraft current position, arrival airport runway configuration, runway ETA's and landing times of aircraft that preceded the aircraft in question (e.g., previous days, months, years), etc. The runway ETA prediction module 136 of the ETA server 130 may then use this information to predict the runway ETA of the aircraft being monitored.

However, the information provided by the passive radar data source 110 may not be sufficient to predict the gate ETA. Thus, in this exemplary embodiment at least one other data source 111 is provided to provide the ETA server 130 with additional information so that the gate prediction module 135 may predict the gate ETA for the aircraft.

The following will provide exemplary additional information that may be used to predict the gate ETA. However, those skilled in the art will understand that other information in addition to, or exclusive from, the exemplary information may also be used. A first category of additional information that may be introduced to aid in the prediction of the gate ETA is gate arrival information. This information includes, for example, the gate number to which the aircraft is scheduled to arrive. An exemplary data source 111 that may provide this gate arrival information may be a third party vendor that tracks gate arrival information or the airline itself. In either case, the data source 111 may be an automated feed that provides the gate arrival information.

By providing the passive radar data from the data source 110 and the gate arrival information from the data source 111, the gate prediction module 135 may predict the gate ETA. For example, the gate prediction module 135 could predict the runway ETA using the data described above, or receive the runway ETA from the runway ETA prediction module 136. The gate prediction module can then use the gate arrival information to determine the gate at which the aircraft is scheduled to arrive and then use the historical data of, for example, an average time from actual runway arrival to the specific gate to which the aircraft is scheduled to arrive, thereby calculating the gate ETA from the passive radar data and the gate arrival information (including historical data).

While the gate arrival information may be used to predict the gate ETA, the gate prediction module 135 may need additional information to more accurately predict the gate ETA. This second category of additional information may be the runway landed information. The landed runway information may be input from a runway prediction program, the filed flight plan, and/or the airline's database. The runway prediction algorithm may predict the runway that the aircraft is going to land on based on a variety of factors. For example, the passive data may include location, heading and speed information from which the passive system may predict the runway on which the aircraft will land. In addition, the passive system may have historical data that can be combined with the data collected for the particular aircraft in order to predict the landed runway.

Thus, if the gate prediction module 135 has received the gate arrival information and the landed runway information, the gate prediction module may now use the same method described above when only having the gate arrival information, except that now the gate prediction module 135 may only look at historical data for aircraft that have come from the landed runway to the arrival gate. This may further refine the predicted gate ETA.

It should be noted that the gate ETA may be constantly updated by the gate prediction module 135. For example, a first gate ETA may be based on the passive data prediction of the runway ETA, the gate arrival information and the predicted landed runway. However, after the aircraft has landed, the runway ETA and the landed runway become certain information. Thus, the gate prediction module 135 may substitute this certain information for the predicted information to refine the gate ETA.

It should be further noted that the historical data may also be refined based on the airport conditions. For example, the historical data may be separated or categorized by the ETA server 40 based on the operating conditions of the airport. Thus, there may be a first average time for transit from the landed runway to the gate when the visibility is clear and it is daytime, a second average time when it is night time, a third average time on a weekend, a fourth average time on a holiday travel day, a fifth average time when the airport is experiencing an abnormal operation condition (e.g., weather emergency), etc. Thus, when the historical data is collected, another data source may also collect the data on the airport operating condition so that this information may be factored into predicting the gate ETA.

Thus, the exemplary embodiment of the present invention allows for the gate prediction module 135 of the ETA server 130 to predict a gate ETA for aircraft arriving at an airport. This information may then be disseminated to interested parties 150-152 via the communication network 140. In one exemplary embodiment, the ETA server 130 (or other device) may host a web server that makes a web page available with the gate ETA predictions for the incoming aircraft. However, the gate ETAs may be disseminated in any number of manners including, for example, sending emails to subscribed members, sending data to an airline or airport control center so the ETA can be displayed on monitors within the terminal, etc.

Figure 2:
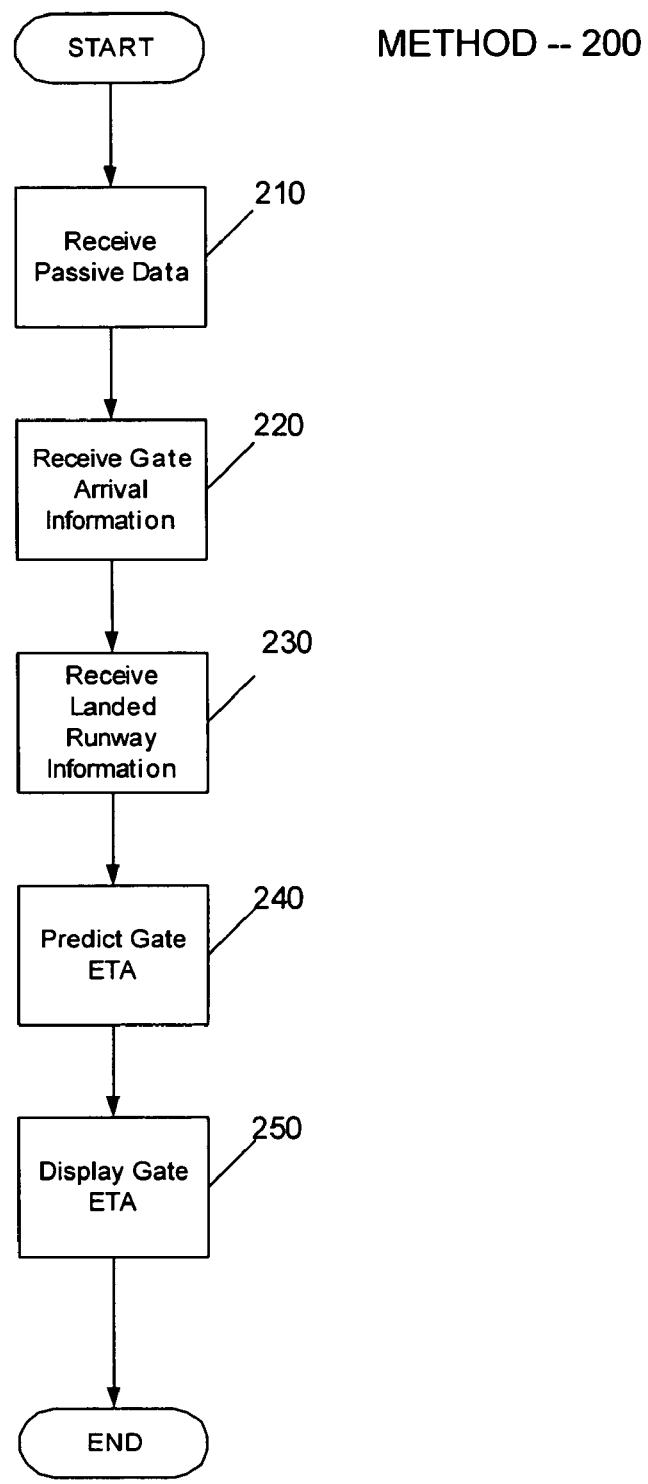
FIG. 2 shows an exemplary method 200 for predicting gate ETAs according to the present invention.

FIG. 2 shows an exemplary method 200 for predicting gate ETAs. The method 200 will be described with reference to the exemplary components of FIG. 1. In step 210, the ETA server 130 receives the passive data for an aircraft from the passive data source 110. In step 220 and 230, the ETA server receives at least one of additional information that may be used to predict the gate ETA. This additional information may be gate arrival information (step 220) and/or landed runway information (step 230). Exemplary data sources for this additional information were previously described.

In step 240, the gate prediction module 135 will use the passive data collected for the aircraft of interest and combine this with the gate arrival information and/or the landed runway information and predict a gate ETA. As part of this prediction, the gate prediction module 135 will also use historical data for the airport that includes a time that it took previously landed planes from a specific runway (or anywhere on the airport facility) to reach a specified gate. In the case where the aircraft of interest is still in the air, the gate prediction module may generate its own runway ETA or receive a runway ETA from a separate runway prediction module. In addition, while the aircraft is still in the air, the gate prediction module 135 may also use a runway prediction algorithm to determine a predicted runway to use as the landed runway for purposes of calculating the gate ETA. After the aircraft has landed, the gate prediction module may be able to substitute the actual landing time and the actual landed runway for the previously predicted data in order to update the gate ETA. After the gate ETA has been predicted in step 240, the ETA server 130 distributes the predicted gate ETAs to users in step 250.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
a data receiving arrangement receiving aircraft-of-interest data corresponding to an aircraft in a vicinity of an airport and additional information corresponding to the aircraft;
a data storage arrangement storing historical data relating to the additional information, the historical data relating to a plurality of previous aircraft arriving at the airport;
a runway prediction module determining a predicted runway for the aircraft-of-interest using a runway prediction algorithm; and a gate prediction module determining a predicted time of arrival at a gate based on the aircraft-of-interest data, the predicted runway, the historical data and the additional information.

2. The system of claim 1, wherein the additional information is one of gate arrival information and landed runway information.

3. The system of claim 1, wherein the historical data is one of an average time from any location on the airport to a specified gate and an average time from a runway on the airport to a specified gate.

4. The system of claim 1, wherein the data storage arrangement stores the historical data according to a category of operation of the airport and the data receiving arrangement receives supplemental information identifying a current category of operation of the airport, the gate prediction module further basing the predicting on the category of historical data corresponding to the current category.

5. The system of claim 1, further comprising:
a data distribution arrangement for distributing the predicted time of arrival to users of the system.

6. The system of claim 1, wherein the gate prediction module, in determining the predicted time of arrival at the gate, performs one of receiving a runway time of arrival and predicting the runway time of arrival.

7. The system of claim 1, wherein the gate prediction module determines the predicted time of arrival at the gate a first time while the aircraft is in flight and determines the predicted time of arrival at the gate a second time after the aircraft has landed, wherein the additional information is of a first type when the aircraft is in flight and the additional information is of a second type when the aircraft has landed.

8. A system comprising a memory storing a set of instructions and a processor executing the instructions, the set of instructions being operable to:
receive aircraft-of-interest data corresponding to an aircraft in a vicinity of an airport;
receive additional information corresponding to the aircraft;
receive historical data relating to the additional information, the historical data relating to a plurality of previous aircraft arriving at the airport;
determine a predicted runway for the aircraft-of-interest using a runway prediction algorithm; and
determine a predicted time of arrival at a gate based on the aircraft-of-interest data, the predicted runway, the historical data and the additional information.

* * * * *